(12) United States Patent
Chen et al.

(10) Patent No.: US 9,555,524 B2
(45) Date of Patent: Jan. 31, 2017

(54) CLAMPING DEVICE FOR CLAMPING A FASTENER

(71) Applicant: Chervon (HK) Limited, Wanchai (HK)

(72) Inventors: Liang Chen, Nanjing (CN); Guigong Ni, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 623 days.

(21) Appl. No.: 13/932,449

(22) Filed: Jul. 1, 2013

(65) Prior Publication Data

US 2014/0001714 A1    Jan. 2, 2014

(30) Foreign Application Priority Data

Jul. 2, 2012    (CN) .......................... 2012 1 0222605
May 27, 2013   (CN) .......................... 2013 1 0203169
May 27, 2013   (CN) ....................  2013 2 0300662 U
May 27, 2013   (CN) ....................  2013 2 0302324 U

(51) Int. Cl.
| | |
|---|---|
| *B25B 13/18* | (2006.01) |
| *B23B 31/12* | (2006.01) |
| *B23B 31/173* | (2006.01) |
| *B25B 13/44* | (2006.01) |
| *B25B 13/46* | (2006.01) |

(52) U.S. Cl.
CPC .......... *B25B 13/18* (2013.01); *B23B 31/1207* (2013.01); *B23B 31/16158* (2013.01); *B25B 13/44* (2013.01); *B25B 13/466* (2013.01); *Y10T 279/17411* (2015.01); *Y10T 279/17504* (2015.01); *Y10T 279/17649* (2015.01); *Y10T 279/17701* (2015.01)

(58) Field of Classification Search
CPC ............ B23B 31/1207; B23B 31/1215; B23B 31/16158; B23B 2231/2086; B23B 2231/30; B25B 13/18; B25B 13/44; Y10T 279/17411; Y10T 279/17504; Y10T 279/17649; Y10T 279/17701

See application file for complete search history.

(56) References Cited

U.S. PATENT DOCUMENTS

| 323,178 | A | * | 7/1885 | Mason ................ | B23B 31/1253 |
| | | | | | 279/59 |
| 728,276 | A | * | 5/1903 | Muehlberg .......... | B23B 31/1253 |
| | | | | | 279/103 |
| 939,102 | A | * | 11/1909 | Schultis .............. | B23B 31/1253 |
| | | | | | 279/69 |

(Continued)

*Primary Examiner* — Eric A Gates
(74) *Attorney, Agent, or Firm* — Greenberg Traurig, LLP

(57) ABSTRACT

A clamping device for clamping a fastener, includes a clamping jaw, a first biasing member for biasing the clamping jaw, a clamping body having a central axis, a driving assembly for driving the clamping jaw to clamp the fastener, and a second member which can be driven by the first member to move axially relative to the clamping body so as to push the clamping jaw to clamp the fastener. The clamping body is formed with a notch for receiving the clamping jaw and the driving assembly is supported on the clamping body and includes a first member which can rotate and move axially relative to the clamping body. The installation structures between the clamping body, the driving assembly and the clamping jaw may be designed to be more compact so that the clamping device has a smaller size.

14 Claims, 13 Drawing Sheets

(56) References Cited

U.S. PATENT DOCUMENTS

| | | | | |
|---|---|---|---|---|
| 1,008,057 A * | 11/1911 | Peck | B23B 31/1253 | 279/69 |
| 2,413,422 A * | 12/1946 | Teige | B23B 31/1253 | 279/64 |
| 2,458,824 A * | 1/1949 | Axelsson | B23B 31/1215 | 279/64 |
| 2,678,827 A * | 5/1954 | Cawi | B23B 31/16158 | 279/56 |
| 2,716,555 A * | 8/1955 | Rowe | B23B 31/1253 | 279/150 |
| 2,749,134 A * | 6/1956 | Penasack | A61C 1/144 | 279/103 |
| 3,467,403 A * | 9/1969 | Michelsen | B23B 31/1215 | 279/58 |
| 3,702,705 A * | 11/1972 | Schadlich | B23B 31/1253 | 279/62 |
| 3,795,406 A * | 3/1974 | Rohm | B23B 31/1253 | 279/140 |
| 4,266,789 A * | 5/1981 | Wahl | B23B 31/1253 | 279/59 |
| 4,366,733 A * | 1/1983 | Colvin | B25B 13/18 | 279/65 |
| 4,527,809 A * | 7/1985 | Umbert | B23B 31/1253 | 279/60 |
| 4,563,013 A * | 1/1986 | Hunger | B23B 31/123 | 279/157 |
| 4,663,999 A * | 5/1987 | Colvin | B25B 13/18 | 279/65 |
| 4,695,065 A * | 9/1987 | Komatsu | B23B 31/1253 | 279/60 |
| 4,902,025 A * | 2/1990 | Zimdars | B23B 31/123 | 279/60 |
| 6,341,544 B1 * | 1/2002 | Falzone | B25B 13/44 | 81/128 |
| 6,641,145 B1 * | 11/2003 | Nebe | B23B 31/1253 | 279/46.7 |
| 7,261,021 B1 * | 8/2007 | Carnesi | B25B 13/44 | 279/71 |
| 7,707,916 B2 * | 5/2010 | Pirseyedi | B25B 13/44 | 279/64 |
| 2014/0232073 A1 * | 8/2014 | Marchand | B23B 31/1253 | 279/74 |

* cited by examiner

CLAMPING DEVICE FOR CLAMPING A FASTENER

CROSS REFERENCE TO RELATED APPLICATION

This application is a non-provisional application claiming priority from Chinese Patent Application No. 201210222605.6 filed Jul. 2, 2013, Chinese Patent Application No. 201320302324.1, filed May 27, 2013, Chinese Patent Application No. 201320300662.1, filed May 27, 2013, and Chinese Patent Application No. 201310203169.2, filed May 27, 2013, each of which are incorporated herein by reference in their entirety.

FIELD OF THE DISCLOSURE

The present disclosure relates to a clamping device for clamping a fastener.

BACKGROUND OF RELATED ART

A clamping device for clamping a fastener, such as for example a bolt, is generally attached to an electrical wrench or a manual wrench. Currently, the common clamping device has various mechanisms for mating with the fasteners having different sizes. However, with regard to the various types of known clamping devices, when in use, on one hand, they are inconvenient to carry, and on the other hand, it is oftentimes difficult for the common user to know how to choose and/or use the appropriate clamping device.

For example, international patent application publication number WO2009132426 describes an adjustable clamping device, wherein the clamping device can clamp bolts with various sizes. However, such a clamping device has a relatively complex structure with large overall size, and the manufacturing cost is high.

SUMMARY

In order to overcome at least some of the defects in the prior art, one objective of the present disclosure is to provide a clamping device having a compact structure and a small overall size.

In order to obtain at least the above objective, the present disclosure provides a clamping device for clamping a fastener, comprising: a clamping jaw; a first biasing member for biasing the clamping jaw; a clamping body having a central axis, the clamping body being formed with a notch for receiving the clamping jaw; a driving assembly for driving the clamping jaw to clamp the fastener, the driving assembly being supported on the clamping body and comprising a first member which may rotate and move axially relative to the clamping body, and a second member which may be driven by the first member to move axially relative to the clamping body so as to push the clamping jaw to clamp the fastener.

The driving assembly of the present disclosure comprises two members, the rotating motion of the first member can be converted into the axial movement of the second member, and then the clamping jaw can be driven to move via the second member so as to clamp the fastener. Because the member for driving the clamping jaw just moves axially, the installation structures between the clamping body, the driving assembly and the clamping jaw may be designed to be more compact so that the clamping device has a smaller size.

DETAILED DESCRIPTION

The following will further describe the present disclosure with reference to the drawings. The following examples are only used to explain the technical solutions of the present disclosure clearly, and cannot be used to limit the protection scope of the present disclosure.

Figure 1:
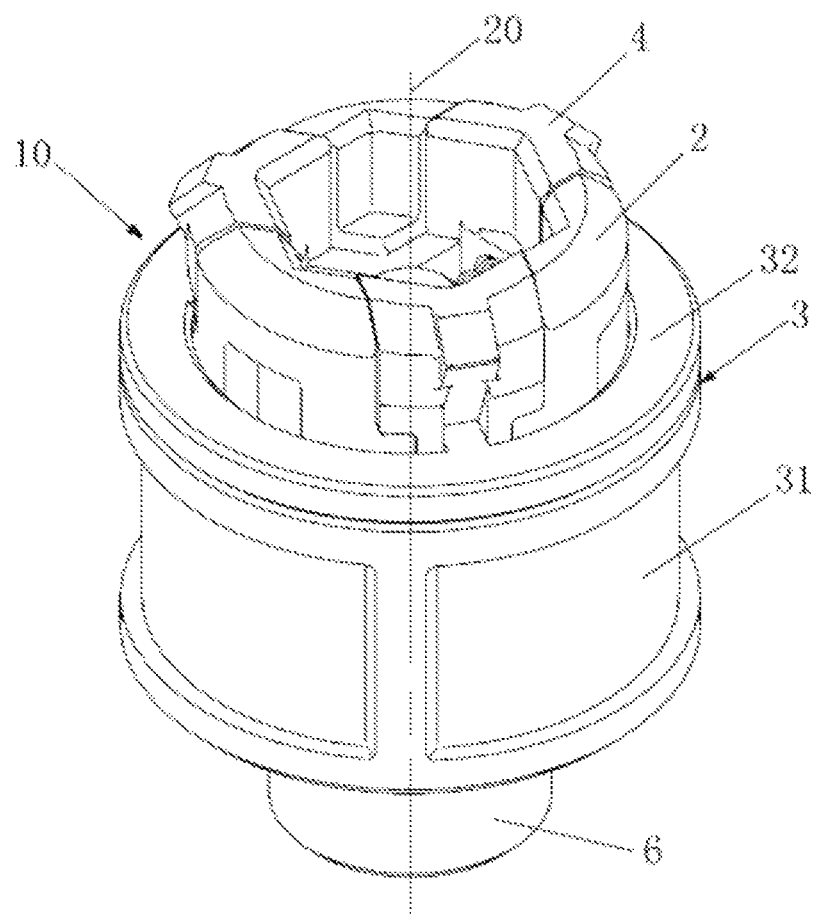
FIG. 1 is a schematic view of the clamping device of the present disclosure.

As shown in FIG. 1, it shows the schematic view of the clamping device 10 of the present disclosure. The clamping device 10 of the present disclosure can be mounted to the manual wrench or the electrical wrench for screwing the fastener such as a bolt manually or electrically.

Figure 2:
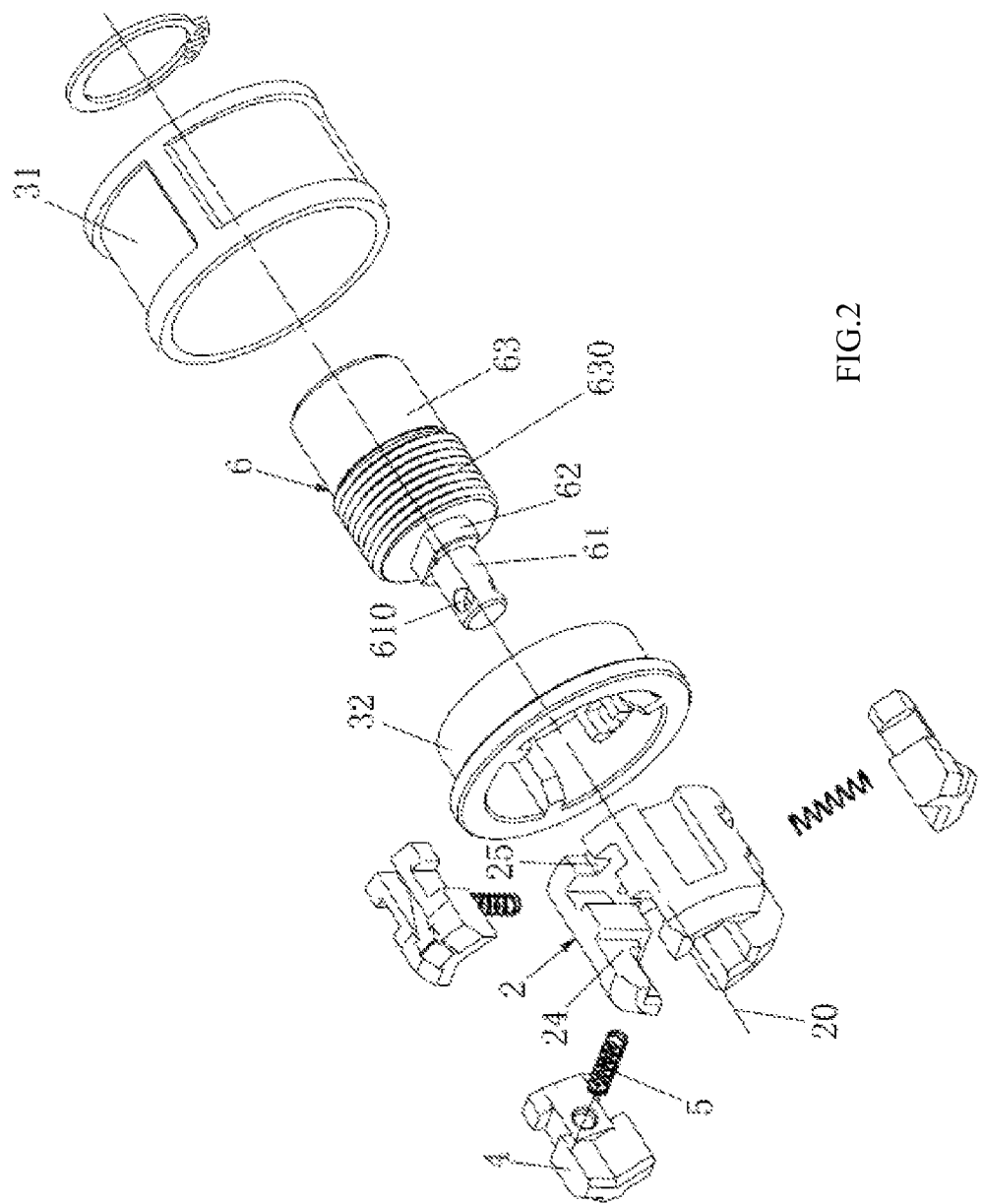
FIG. 2 is an exploded view of the clamping device.

As shown in FIG. 2, the clamping device 10 of the present disclosure comprises a clamping body, a driving assembly 3, a clamping jaw 4 and a first biasing member 5. The clamping body comprises a receiving portion 2 and a supporting shaft 6. The receiving portion 2 is used to receive a fastener such as a bolt (not shown), which is generally a hollow cylinder and has a central axis 20. The central axis 20 is also the central axis of the whole clamping device 10. The circumference of the receiving portion 2 is provided with three notches 24 for receiving three clamping jaws 4. The notches 24 extend from the circumference surface of the receiving portion 2 to the front end surface of the receiving portion 2. The three notches 24 are arranged at the same angle with respect to the circumferential direction of the receiving portion 2, and the angle between the two adjacent notches 24 is 120°. The shape of the notch 24 is consistent with that of the clamping jaw 4 so that the clamping jaw 4 cannot move in the circumferential direction of the receiving portion 2 when the clamping jaw 4 is received into the notch 24. With the guidance of the notch 24, the clamping jaw 4 can move in the radial direction of the receiving portion 2 so as to clamp or release the bolt. A guiding groove 25 communicated with the notch 24 is formed between each notch 24 and the rear end surface of the receiving portion 2.

For clear description, the front end mentioned in the present disclosure refers to the end facing the bolt to be clamped in the axis direction of the clamping device; contrarily, the rear end refers to the end away from the bolt.

In this example, the clamping device 10 comprises three clamping jaws 4. However, a person of ordinary skill in the art can appreciate that any number of clamping jaws can be used to achieve the same function.

Additionally, in this example, the receiving portion 2 and the supporting shaft 6 of the clamping body are two separate members connected with each other, but in the other examples, the receiving portion 2 and the supporting shaft 6 may be formed in one piece.

Figure 3:
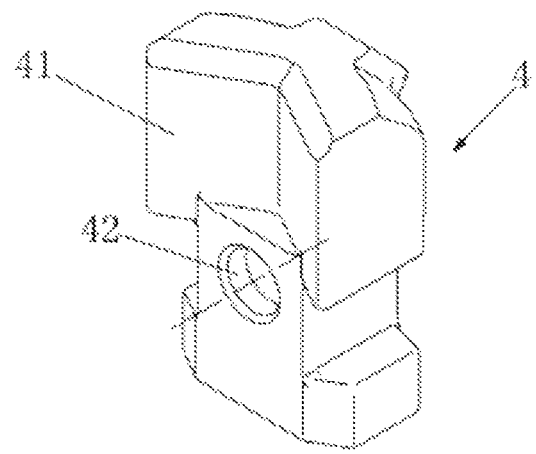
FIG. 3 is a schematic view of the clamping jaw.
Figure 4:
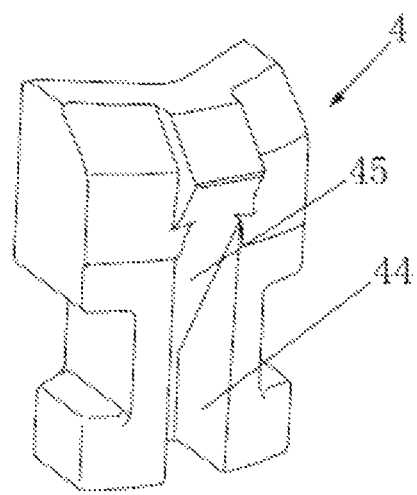
FIG. 4 is a schematic view of the clamping jaw taken from another angle.

The clamping jaw 4 has an inner side wall and an outer side wall. As shown in FIG. 3, the inner side wall is provided with a V-shaped groove 41 and a circular groove 42. The V-shaped groove 41 is used to mate with the head of the bolt. The circular groove 42 is arranged below the V-shaped groove 41 and used for receiving one end of the first biasing member 5. As shown in FIG. 4, the outer side wall of the clamping jaw 4 is provided with an elongated groove 44 extending in the longitudinal direction. An inclined guiding wall 45 extends from the elongated groove 44 towards the front end of the clamping jaw 4 and has the generally same width as that of the elongated groove 44.

For clear description, the inner side wall mentioned in the present disclosure refers to the side wall facing the bolt to be clamped in the radial direction of the clamping direction; contrarily, the outer side wall refers to the side wall away from the bolt.

Figure 5:
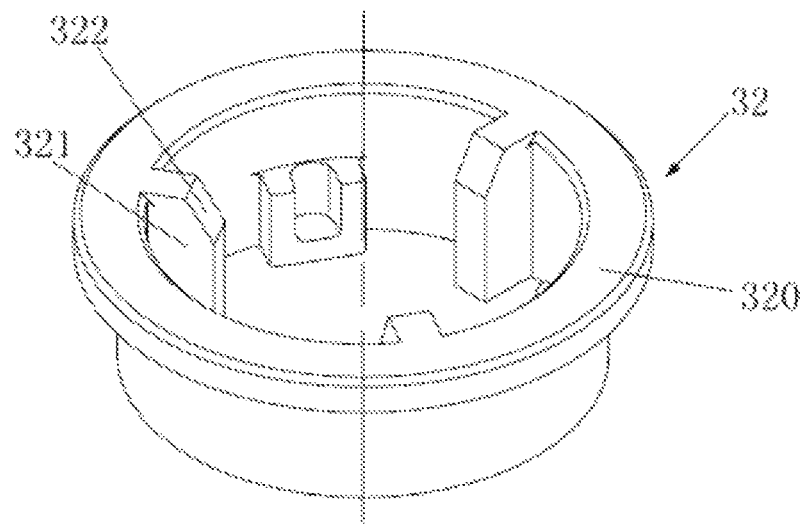
FIG. 5 is a schematic view of the pushing ring.
Figure 6:
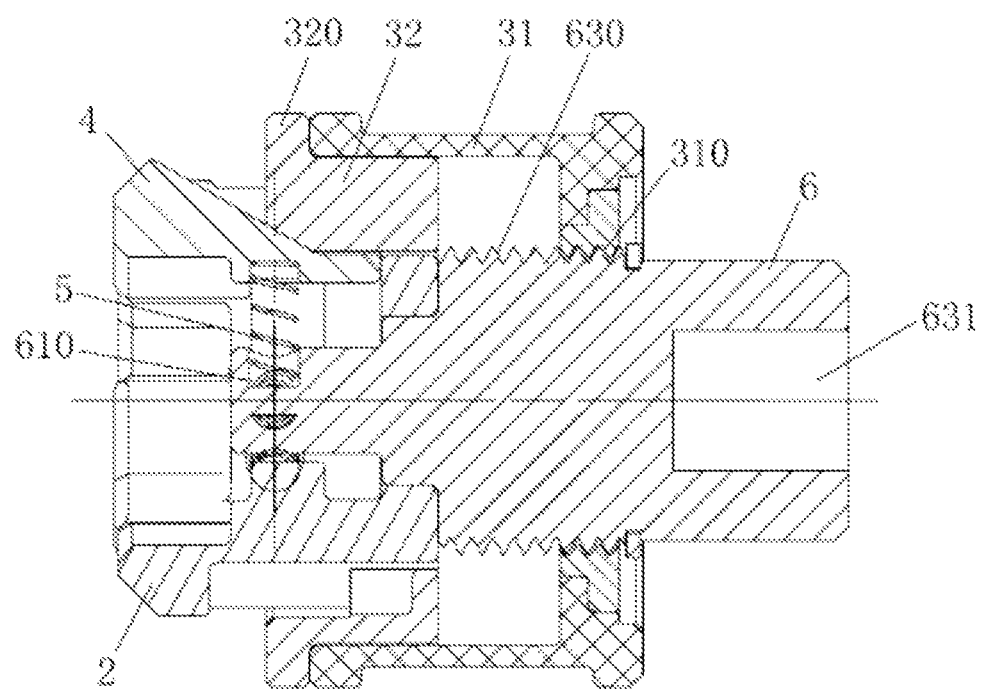
FIG. 6 is a sectional view of the clamping device.
Figure 7:
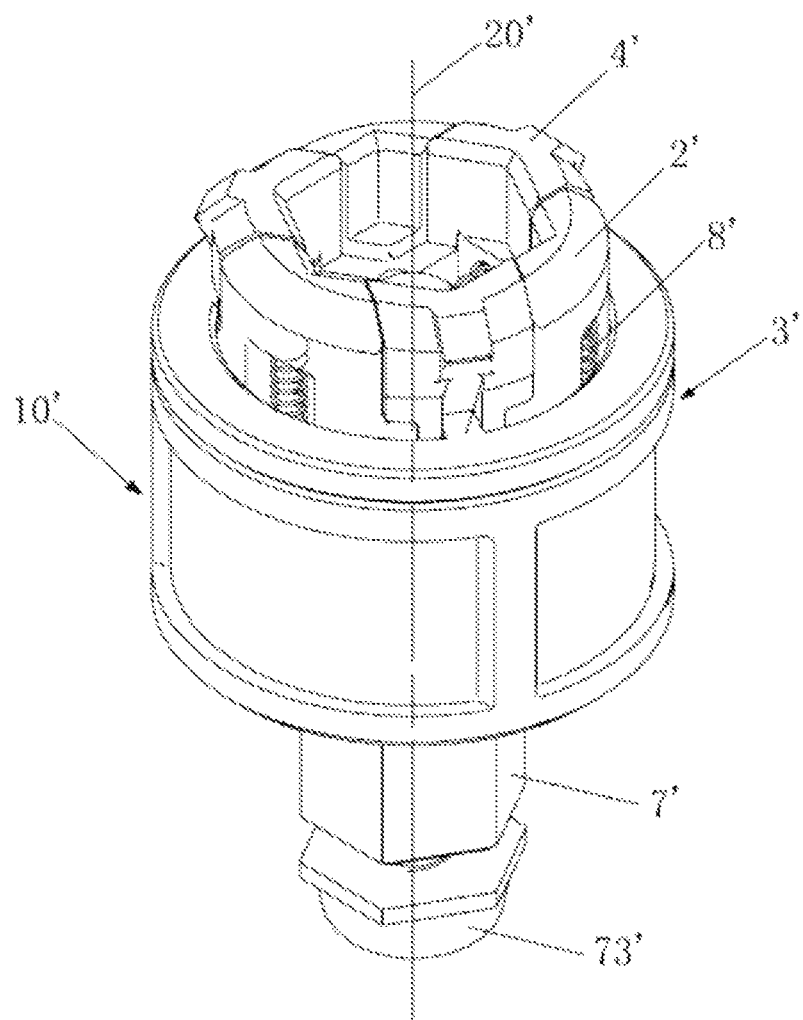
FIG. 7 is a schematic view of the clamping device of the second example according to the present disclosure.

As shown in FIG. 2, the driving assembly 3 comprises a first member, i.e., a rotating ring 31, which may rotate and move axially relative to the clamping body, and a second member, i.e., a pushing ring 32, which may be driven by the first member to move axially relative to the clamping body so as to push the clamping jaw to clamp the fastener. The rotating ring 31 may be rotated by the user and the inner wall thereof is provided with inner threads 310 (as shown in FIG. 6). In this example, the rotating ring 31 comprises two members, i.e., an outer ring and an inner ring, and the inner threads 310 are formed in the inner ring. However, in other examples, the rotating ring 31 may be a member formed in one piece, and the inner threads 310 are directly formed in the inner wall of the rotating ring 31. The pushing ring 32 is used to push the clamping jaws 4 to move so as to clamp the bolt. As shown in FIG. 5, one end of the pushing ring 32 has a flange 320, and the inner wall thereof is provided with three pushing blocks 321 extending towards the central axis 20 of the pushing ring 32 for pushing the clamping jaws 4. Accordingly, the pushing blocks 321 are arranged at the same angle with respect to the circumferential direction, and the angle between the two adjacent pushing blocks 321 is 120°. The pushing blocks 321 extend along the axial direction and are substantially formed into a long bar shape. The width of the pushing block 321 is generally the same as that of the guiding groove 25 in the receiving portion 2 or the elongated groove 44 of the clamping jaw 4. The pushing block 321 is formed with an inclined pushing plane 322. The inclined pushing plane 322 can be engaged with the inclined guiding wall 45 of the clamping jaw 4.

As shown in FIG. 2, the supporting shaft 6 of the clamping body is used to support the receiving portion 2 and the driving assembly 3. The supporting shaft 6 is generally a stepped shaft and has a first shaft portion 61, a second shaft portion 62 and a third shaft portion 63 having increasing outer diameters in turn, wherein the first shaft portion 61 has the smallest outer diameter. The first shaft portion 61 is provided with three holes 610 in the circumferential direction, and each of them is used for receiving the other end of the first biasing member 5. Accordingly, the three holes 610 are arranged at the same angle with respect to the circumferential direction and the angle between the two adjacent holes 610 is 120°. The second shaft portion 62 is designed as flat shape 3 so as to mate with a rectangular hole (not shown) of the receiving portion 2, thus the receiving portion 2 cannot rotate with respect to the supporting shaft 6. The outer circumference of the third shaft portion 63 is provided with outer threads 630 for engaging with the inner threads 310 of the rotating ring 31. As shown in FIG. 6, the free end of the third shaft portion 63 is provided with a mating portion 631 for mounting the clamping device 10 to the manual wrench or the electrical wrench. In this example, the mating portion 631 is a mounting hole, but in other examples, the mating portion may also be arranged on the outer surface of the supporting shaft 6.

Referring to the assembled state as shown in FIG. 6, the supporting shaft 6 is inserted into the receiving portion 2 and the driving assembly 3, and the second shaft portion 62 of the supporting shaft 6 is mated with the rectangle hole of the receiving portion 2 so that there is no relative rotation between the receiving portion 2 and the supporting shaft 6, and the first shaft portion 61 is located in the receiving portion 2. The three clamping jaws 4 are respectively located in the three notches 24 of the receiving portion 2. One end of the first biasing member 5 is located in the circular groove 42 of the clamping jaw 4, and the other end is located in the hole 610 of the supporting shaft 6 and exerts a biasing force to the clamping jaw 4, so that the clamping jaw 4 has a trend to move in a direction away from the central axis 20, that is, the clamping jaw 4 is in an opened position and the clamping device 10 is in a released position, i.e., the state as shown in FIG. 6. The pushing ring 32 of the driving assembly 3 is movably mounted to the receiving portion 2. Specifically, the pushing block 321 of the pushing ring 32 is mated with the guiding groove 25 of the receiving portion 2 so that the pushing ring 32 may move axially relative to the receiving portion 2. Meanwhile, the pushing block 321 is partly located in the elongated groove 44 of the clamping jaw 4, and the inclined pushing plane 322 of the pushing block 321 abuts against the inclined guiding wall 45 of the clamping jaw 4 for pushing the clamping jaw 4 to clamp the bolt by overcoming the biasing force of the first biasing member 5. The rotating ring 31 of the driving assembly 3 is mounted to the third shaft portion 63 of the supporting shaft 6, and the inner threads 310 are engaged with the outer threads 630 of the third shaft portion 63, thus the rotating ring 31 can rotate relative to the supporting shaft 6. The pushing ring 32 is partly located in the rotating ring 31, and the front end surface of the rotating ring 31 abuts against the flange 320 of the pushing ring 32.

When clamping the bolt, the head of the bolt is firstly inserted into the receiving portion 2, and then the rotating ring 31 is rotated. With the thread engagement, the rotating ring 31 also moves axially towards the left side in FIG. 6 during the rotation so as to push the pushing ring 32 to move axially towards the left side in FIG. 6. Then, the pushing ring 32 further pushes the clamping jaws 4 to converge towards the central axis 20 by overcoming the biasing force, thereby clamping the bolt. When releasing the bolt, the user may rotate the rotating ring 31 in the opposite direction, and the rotating ring 31 also moves axially towards the right side in FIG. 6 during the rotation, thus the pushing force initially acted on the pushing ring 32 and the clamping jaws 4 is eliminated. Under the action of the biasing force of the first biasing member 5, the clamping jaws 4 are opened automatically and restored to the released state, and the pushing ring 32 is pushed to move towards the right side in FIG. 6.

FIGS. 7-11 illustrate the second example of the clamping device of the present disclosure. In the second example, the clamping device of the present disclosure has a quick-releasing function and comprises a quick-releasing mechanism which can trigger the clamping device to quickly restore to the released state. The quick-releasing mechanism comprises a clutch member 65″ which can be engaged with or disengaged from the driving assembly. When the quick-releasing mechanism is in an unreleased state, the clutch member 65″ is engaged with the driving assembly 3″, and when the quick-releasing mechanism is in a released state, the clutch member 65″ is disengaged from the driving assembly 3″.

Figure 8:
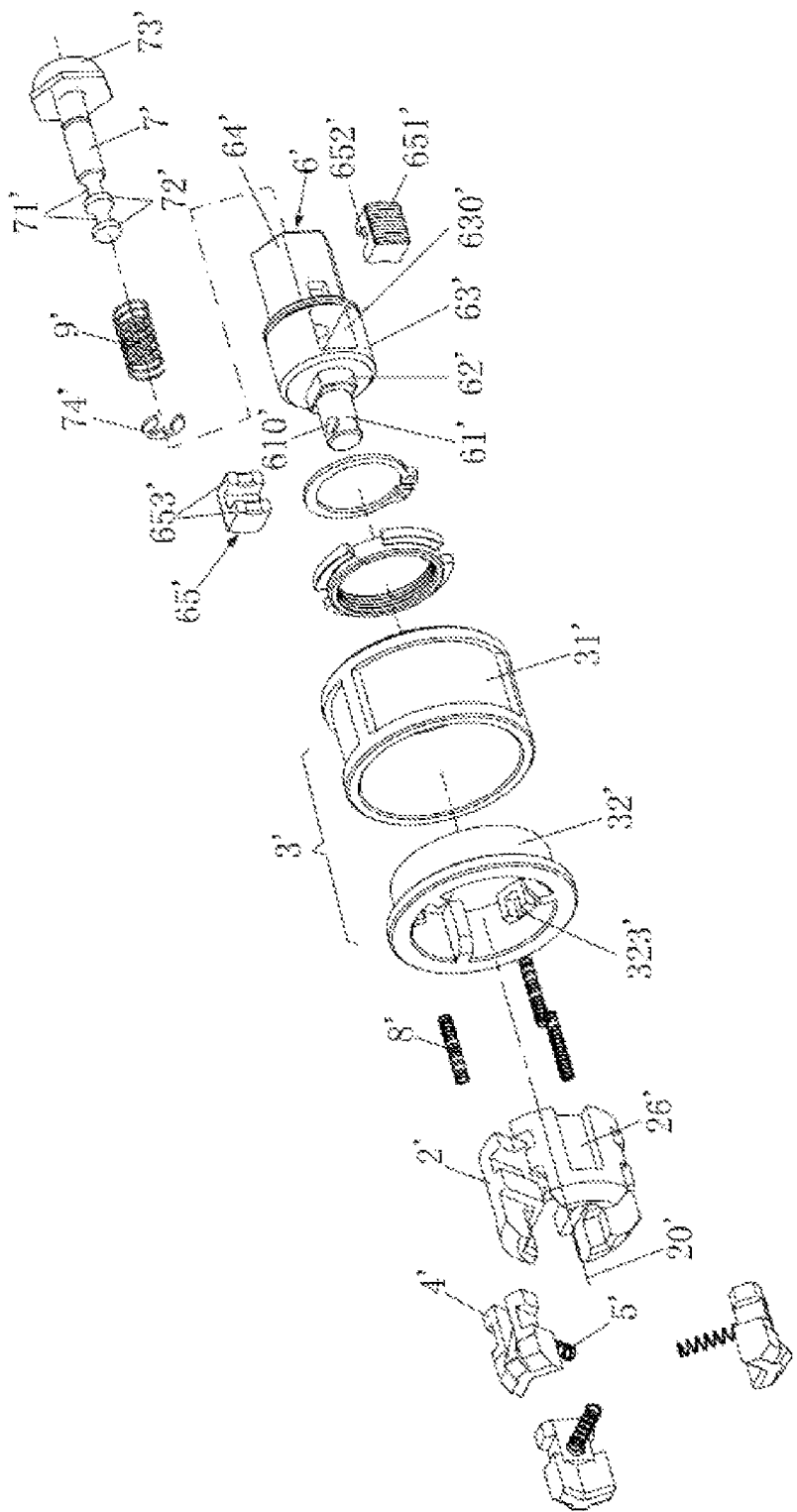
FIG. 8 is an exploded view of the clamping device of FIG. 7.

As shown in FIG. 8, the clamping device 10' comprises a clamping body, a driving assembly 3', a clamping jaw 4' and a first biasing member 5'. The clamping body comprises a receiving portion 2' and a supporting shaft 6'. The supporting shaft 6' is generally a stepped shaft, which has a first shaft portion 61', a second shaft portion 62', a third shaft portion 63' and a fourth shaft portion 64'. The first shaft portion 61' is provided with three holes 610' for receiving one end of the first biasing member 5'. The second shaft portion 62' is designed as flat shape for mating with a rectangular hole (not shown) of the receiving portion 2'. The third shaft portion 63' is provided with a hole 630' for mating with a pair of clutch members 65'. The hole 630' is transverse to an inner hole 60' of the supporting shaft 6' and perpendicular to the central axis 20'. The outer side wall of the clutch member 65' is provided with outer threads 651' for engaging with the inner threads 310' of the rotating ring 31', and the inner side wall is provided with a groove 652' so as to form two legs 653'. The fourth shaft portion 64' is a mating portion with a polygonal shape section plane to be mounted to the manual wrench or the electrical wrench. The quick-releasing mechanism further comprises a quick-releasing shaft 7'. The quick-releasing shaft 7' is inserted into the clamping body and can move relative to the clamping body. The front end of the quick-releasing shaft 7' is formed with two concave portions 71' having relatively smaller diameters and separated by a convex portion 72' (i.e., partial quick-releasing shaft 7'), and the front end of the quick-releasing shaft 7' is also formed the convex portion 72'. The rear end of the quick-releasing shaft 7' is connected with a quick-releasing button 73' to be pressed by the user.

Figure 10:
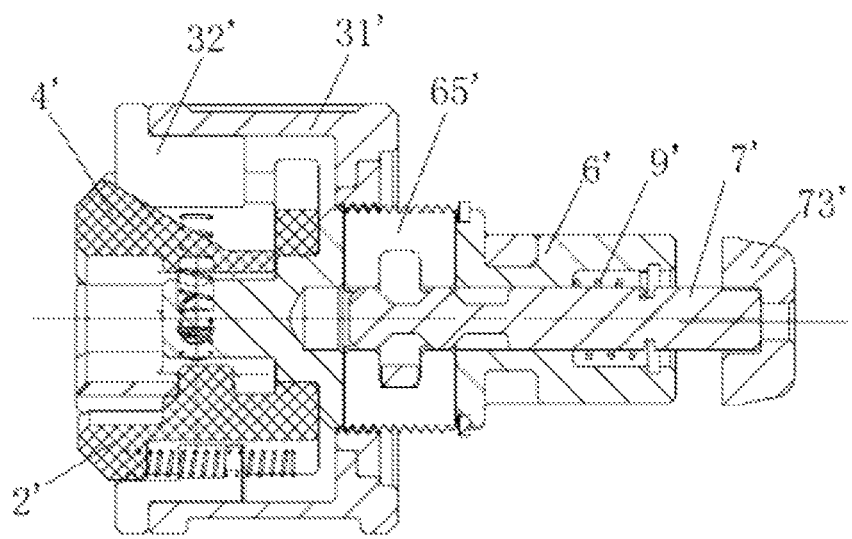
FIG. 10 is a sectional view of the clamping device in a clamped state.

Preferably, an auxiliary biasing member 8' is added between the receiving portion 2' and the pushing ring 32', and mounted between the clamping body and the second member. Specifically, one end of the auxiliary biasing member 8' is held in a groove 26' (as shown in FIG. 10) formed on the outer circumference of the receiving portion 2' of the clamping body, and the other end is held in a groove 323' formed on the inner wall of the second member, i.e., the pushing ring 32'. The auxiliary biasing member 8' exerts a biasing force to the pushing ring 32' so that the pushing ring 32' has a trend to move towards the rear end of the supporting shaft 6'.

Figure 9:
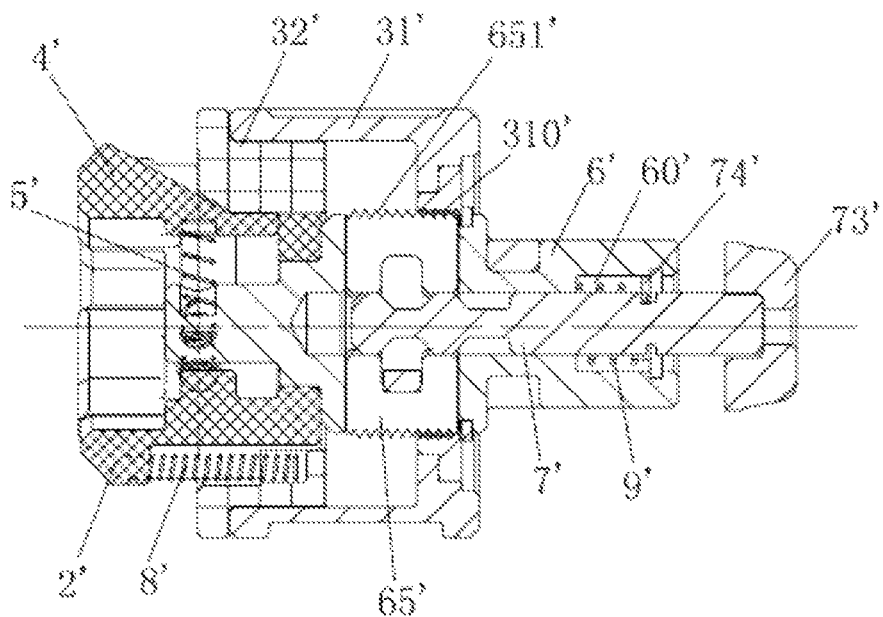
FIG. 9 is a sectional view of the clamping device of FIG. 7 in a released state.

As shown in FIG. 9, in the assembled state, the clutch members 65' are arranged in the hole 630' towards each other, that is, the two legs 653' of the two clutch members 65' face the central axis 20' and the outer threads 651' are arranged away from the central axis 20'. The quick-releasing shaft 7' is inserted into the inner hole 60' of the supporting shaft 6'. A gasket 74' is mounted to the quick-releasing shaft 7', and located in the inner hole 60' of the supporting shaft 6'. A second biasing member 9' is mounted to the quick-releasing shaft 7', and located between the shaft shoulder of the inner hole 60' of the supporting shaft 6' and the gasket 74'. The second biasing member 9' exerts a biasing force to the quick-releasing shaft 7' so that the quick-releasing shaft 7' has a trend to move towards the rear side of the supporting shaft 6', i.e., the state as shown in FIG. 9. In this state, the two legs 653' of the clutch member 65' just lie on the convex portion 72' of the quick-releasing shaft 7' so that the outer threads 651' of the clutch member 65' are engaged with the inner threads 310' of the rotating ring 31'.

Referring to the clamped state as shown in FIG. 10, the operation mode for clamping the bolt in the second example is the same as that in the first example. That is, the user rotates the rotating ring 31', and the rotating ring 31' moves axially during the rotation so as to push the pushing ring 32' to move axially. The pushing ring 32' overcomes the biasing force of the auxiliary biasing member 8' and pushes the clamping jaws 4 so that the clamping jaws 4 converge towards the central axis 20' to clamp the bolt.

Figure 11:
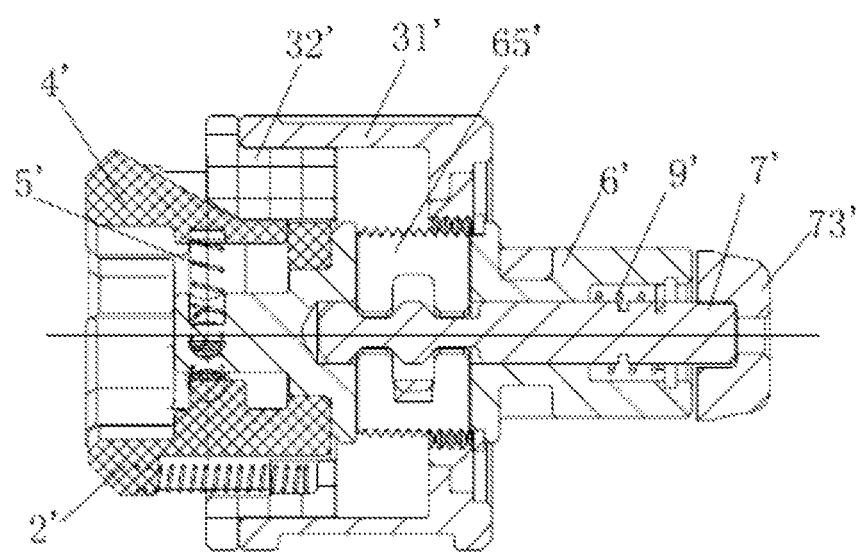
FIG. 11 is a sectional view of the clamping device in a quick released state.
Figure 12:
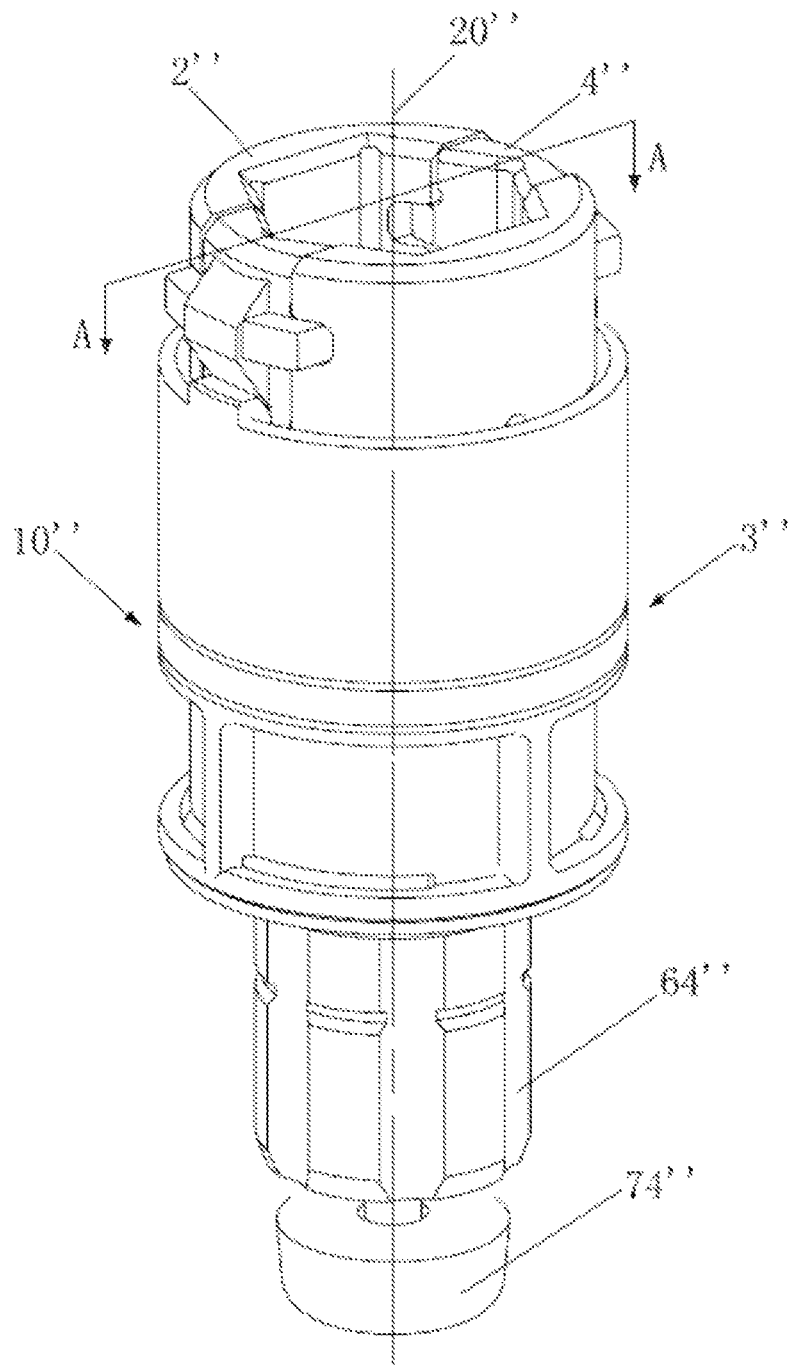
FIG. 12 is a schematic view of the clamping device of the third example according to the present disclosure.

As shown in FIG. 11, when the user wants to restore the clamping device 10' to the initial released state quickly, the user may press the quick-releasing button 73' to push the quick-releasing shaft 7' to overcome the biasing force of the second biasing member 9' and move a certain distance towards the left side in the FIG. 11, so that the two concave portions 72' of the quick-releasing shaft 7' may move to a position just below the two legs 653' of the clutch member 65'. At this moment, under the action of the first biasing member 5', the clamping jaws 4' are opened and restored to the initial position. Under the cooperative action of the opposite pushing force of the clamping jaws 4' and the auxiliary biasing member 8', the driving assembly 3' moves towards the rear end of the supporting shaft 6' and pushes the clutch member 65' so that the two legs 653' of the clutch member 65' are mated with the concave portions 71' of the quick-releasing shaft 7', so as to disengage from the threads of the rotating ring 31'. Then, the driving assembly 3' is restored to the initial position and the clamping device 10' is released quickly. When the user releases the quick-releasing button 73', the quick-releasing shaft 7' moves towards the right side in FIG. 11 under the action of the second biasing member 9' so that the convex portions 72' are mated with the two legs 653' of the clutch member 65' again, and the clutch member 65' is engaged with the rotating ring 32' by threads and restored to the initial state as shown in FIG. 9.

FIGS. 12-17 illustrate the third example of the clamping device of the present disclosure. In the third example, the clamping device of the present disclosure can prevent clamping over-tighten or over-loosen, thereby retaining the clamping device in the predetermined clamped state.

Figure 13:
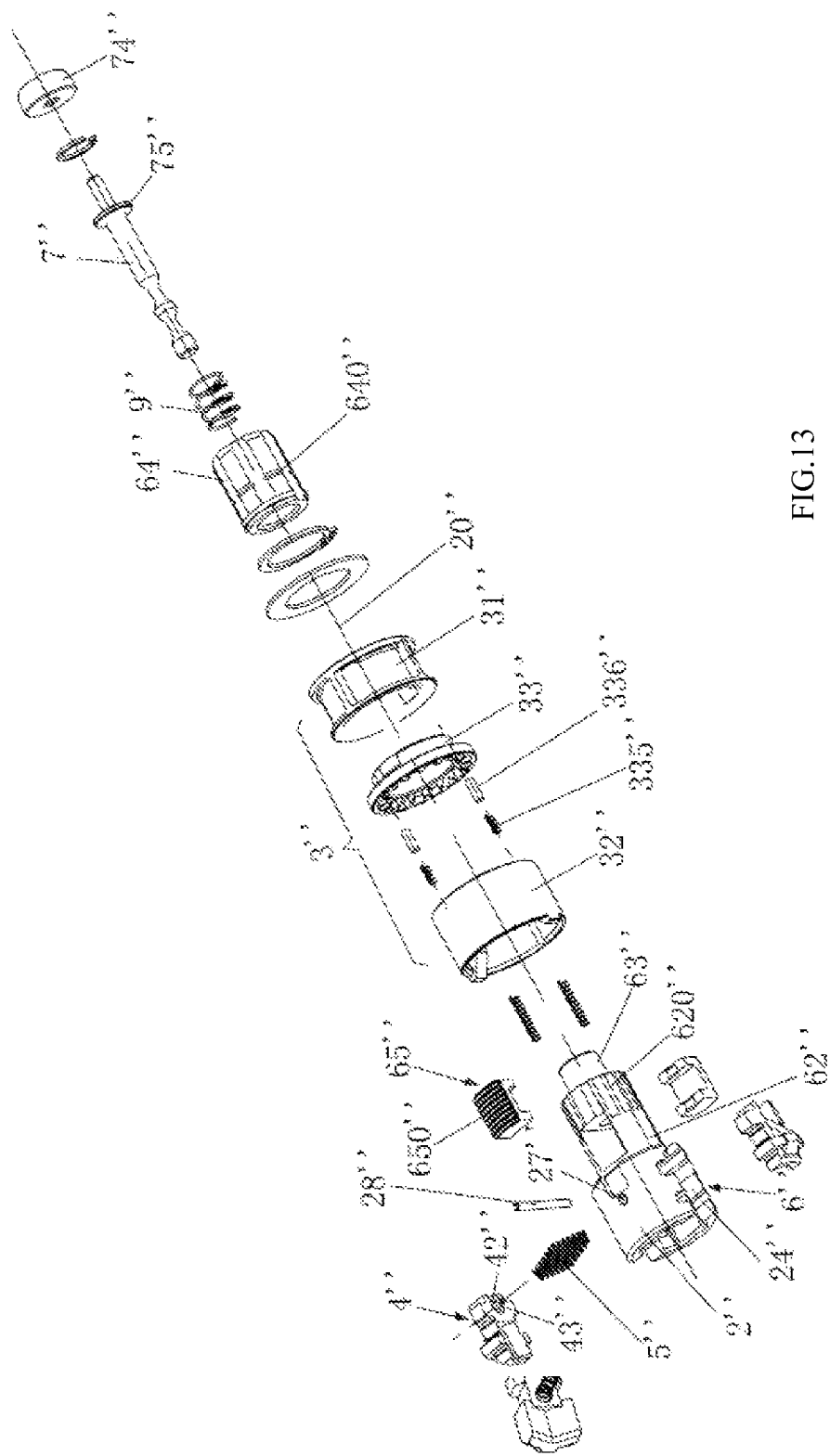
FIG. 13 is an exploded view of the clamping device of FIG. 12.

As shown in FIG. 13, the receiving portion 2″ of the clamping body is integrated with the supporting shaft 6″ to form a first portion of the supporting shaft 6″. The clamping device 10″ comprises a pair of clamping jaws 4″. Correspondingly, the receiving portion 2″ is provided with a pair of notches 24″ for receiving the clamping jaws 4″. The first biasing member 5″ is arranged between the two clamping jaws 4″ with two ends located in the circular grooves 42″ of the two clamping jaws 4″, respectively. A pin 43″ is arranged in the circular groove 42″ for better positioning the first biasing member 5″. In this example, the first biasing member 5″ is a truncated conical spring with a relatively small minimum compression height so that the clamping device 10″ of the present disclosure can clamp the bolt with the minimum size, such as M3 bolt available in the current market. Certainly, the person skilled in the art may also use a common compression spring to replace the truncated conical spring. The receiving portion 2" is also provided with a through-hole 27" in a direction perpendicular to the central axis 20". The axis of the through-hole 27" is perpendicular to a plane formed by the two notches 24". A pin 28" is located in the through-hole 27" for stopping the head of the bolt inserted into the receiving portion 2".

Figure 14:
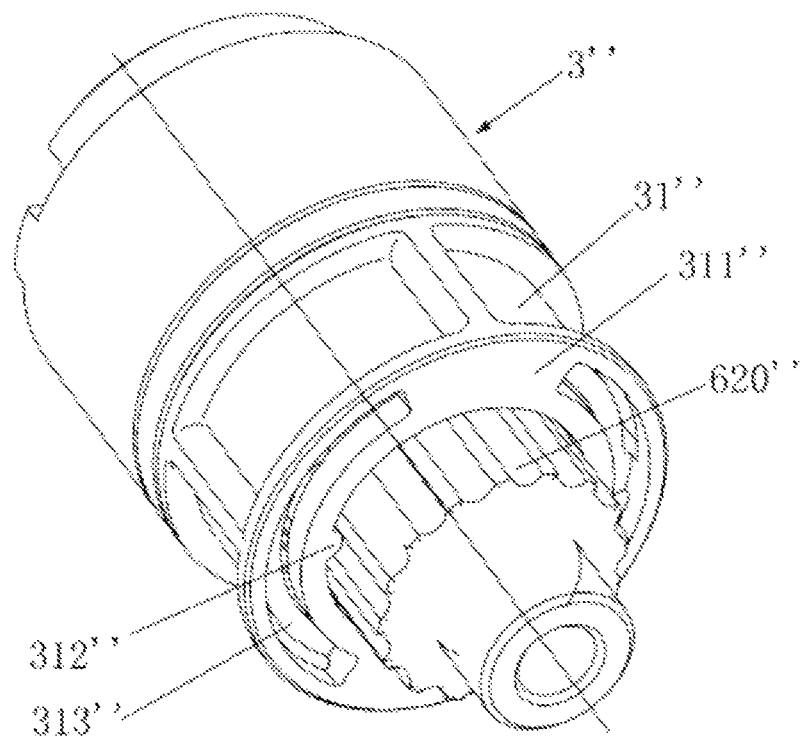
FIG. 14 is a schematic view of the clamping device with part of members removed.

In order to resolve the problem of clamping over-tighten or over-loosen, the clamping body has a first retaining member, and the driving assembly has a second retaining member for mating with the first retaining member. Specifically, the first retaining member is formed on the supporting shaft 6" of the clamping body, and the outer circumference of the second shaft portion 62" of the supporting shaft 6" is provided with a plurality of first grooves 620", i.e., the first retaining members, which extend along the direction of the central axis 20". The second retaining member is formed on the rotating ring 31" of the driving assembly. As shown in FIG. 14, the rear end surface of the rotating ring 31" is provided an annular plate 311". The inner wall of the annular plate 311" is provided with a pair of projections 312", i.e., the second retaining members, which may mate with the first grooves 620". An annular groove 313" is arranged between the projections 312" and the outer circumference of the annular plate 311", thus the projections 312" may have certain elasticity in the radial direction of the annular plate 311". In other examples, the inner wall of the annular plate 311" may be provided with one or more than two projections 312"; additionally, the person skilled in the art may appreciate that the projections 312" may be arranged on the supporting shaft 6" and the first grooves 620" may be arranged on the driving assembly 3' to obtain the same function. With the cooperation of the projections 312" and the first grooves 620", the relative movement between the rotating ring 32" and the supporting shaft 6" may be prevented, thus the over-tighten or over-loosen clamping may be prevented, and the clamping device 10" may be reliably retained in the predetermined clamping state.

In the prior art, when the wrench is braked, the driving assembly may continue to rotate due to the inertia so as to push the pushing ring to move axially to push the clamping jaws, thus it makes the over-tighten clamping and causes a jammed clamping; when the wrench is rotated in the opposite direction, the driving assembly may also be rotated oppositely, thereby causing the over-loosen clamping of the clamping jaws. The cooperation of the projections on the rotating ring and the grooves of the supporting shaft in the clamping device of the present disclosure can effectively resolve the above problems existing in the prior art.

In the third example, the mating portion 64" is mounted to the third shaft portion 63" of the supporting shaft 6" for mounting the clamping device 10" to the manual or electrical wrench. The rear end of the quick-releasing shaft 7" has a plate 75" for positioning the second biasing member 9".

Figure 15:
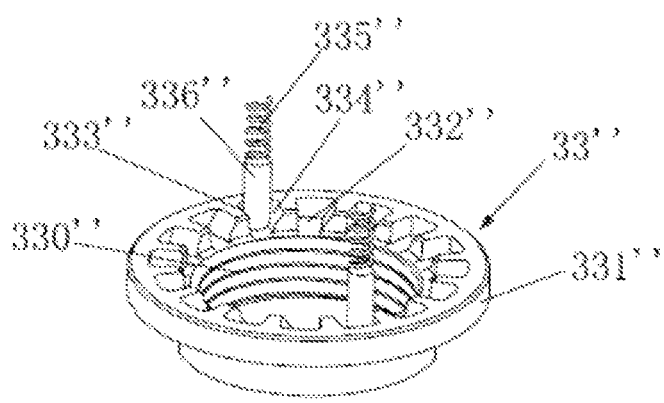
FIG. 15 is a schematic view of the retaining ring.
Figure 16:
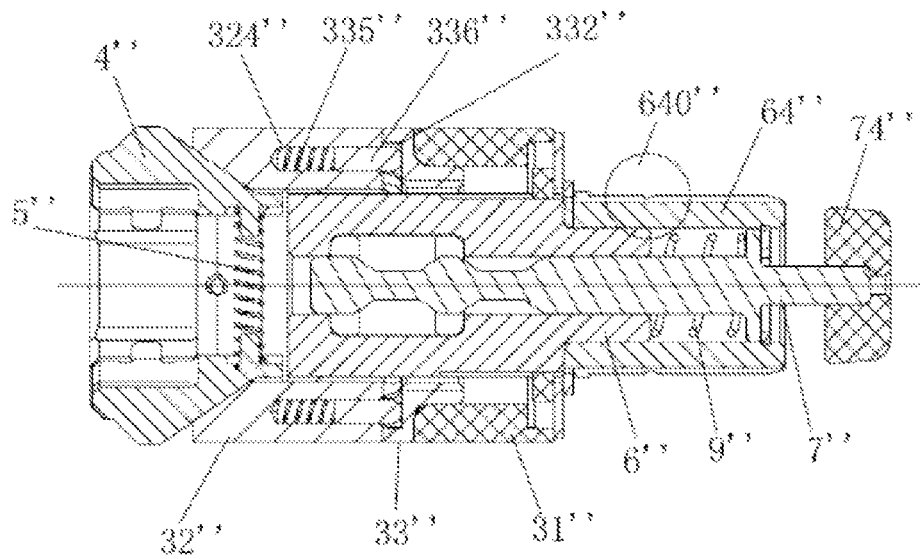
FIG. 16 is a sectional view of the clamping device along A-A direction of FIG. 12.

As shown in FIGS. 13 and 15, as a more preferable example, the driving assembly 3" of the clamping device 10" is additionally provided with a retaining ring 33", as well as a third retaining member and a fourth retaining member which are cooperated with each other for better retaining the clamping device to the predetermined clamped state. One of the third retaining member and the fourth retaining member is a pin, and the other one is a second groove for receiving one end of the pin. The retaining ring 33" is arranged between the rotating ring 31" and the pushing ring 32" and fixedly mounted to the rotating ring 31" For example, the retaining ring 33" can rotate with the rotating ring 31" through a flat portion. The inner wall of the retaining ring 33" is provided with inner threads 330" (as shown in FIG. 15) for engaging with the outer threads 650" of the clutch member 65". The retaining ring 33" also has a flange 331". The end surface of the flange 331" is provided with a plurality of second grooves 332", i.e., the third retaining members. Each second groove 332" has a straight plane 333" and an inclined plane 334". An elastic member 335" and a pin 336", i.e., the fourth retaining members, are arranged between the pushing ring 32" and the retaining ring 33" and abut with each other. As shown in FIG. 16, in the assembled state, the elastic member 335" is located in a hole 324" of the pushing ring 32". One end of the pin 336" is mated with the elastic member 335" and the other end is located in the second groove 332" of the retaining ring 33". When the user clamps the bolt, the retaining ring 33" moves towards a direction with respect to the pushing ring 32", and the pin 336" can slide through the inclined plane 334" from one second groove 332" to another second groove 332", thereby ensuring the relative movement between the retaining ring 33" and the pushing ring 32". When the retaining ring 33" is rotated in the opposite direction, the straight plane 333" of the second groove 332" prevents the movement of the pin 336", thereby limiting the relative movement between the retaining ring 33" and the pushing ring 32". Thus, with this arrangement, the retaining ring 33' can rotate only in one direction, and cannot rotate in the opposite direction, thus it effectively resolves the above problem of over-tighten or over-loosen clamping of the bolt existing in the prior art.

Figure 17:
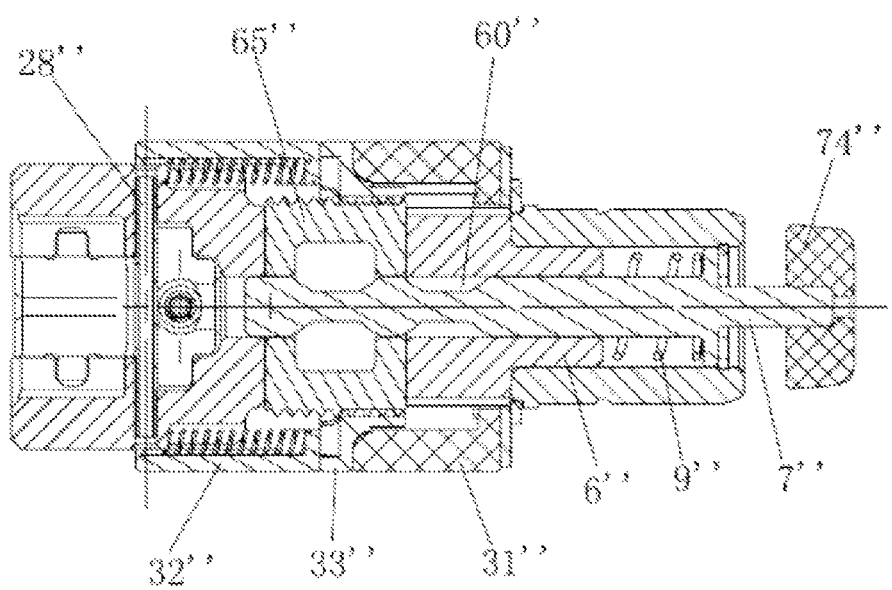
FIG. 17 is a sectional view of the clamping device along a direction perpendicular to the A-A direction.

Referring to the assembled state as shown in FIGS. 16-17, the driving assembly 3" is mounted to the supporting shaft 6", the quick-releasing shaft 7" is inserted into the inner hole 60" of the supporting shaft 6", and the second biasing member 9" is arranged between the rear end of the supporting shaft 6" and the plate 73".

The operation mode of the clamping device of this example is similar to that of the second example. When clamping the bolt, the head of the bolt is inserted into the receiving portion 2" till the head of the bolt contacts the pin 28", then the rotating ring 31" is rotated to force the retaining ring 33" to rotate together, and the rotating ring 31" and the retaining ring 33" also move axially during the rotation so as to push the pushing ring 32" to move towards the left side in the drawings. Then, the pushing ring 32" pushes the clamping jaws 4" to move towards the central axis 20" so as to clamp the bolt. When the bolt needs to be released quickly, the user may only press the quick-releasing button 74" to open the clamping jaws 4" to the most opening degree.

Figure 18:
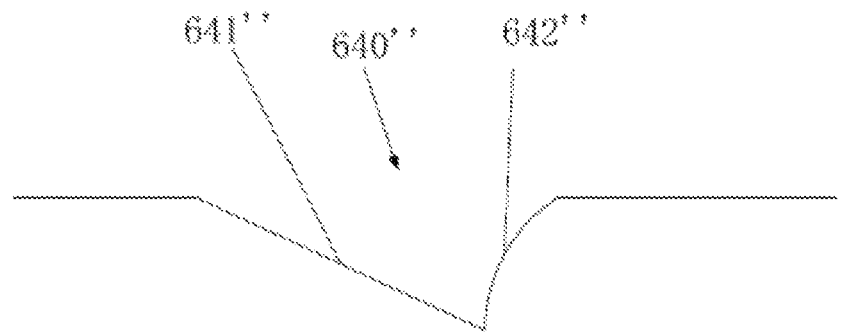
FIG. 18 is a schematic view of the locking groove of the mating portion of the clamping device.
Figure 19:
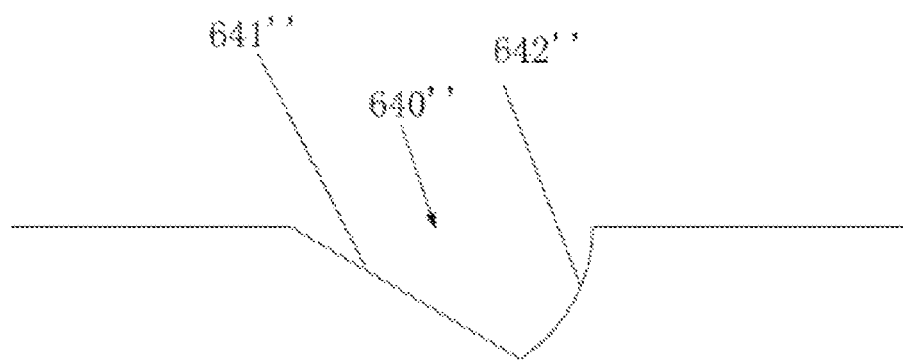
FIG. 19 is a schematic view of another example of the locking groove of the mating portion of the clamping device.

As shown in FIG. 13, the outer surface of the mating portion 64" is provided with a circle of locking grooves 640" for locking with the locking rings (not shown) on the wrench so that the clamping device may be relatively and fixedly connected to the wrench. As shown in FIG. 18, preferably, each locking groove 640" is formed by a first plane 641" and a second plane 642" intersected with each other. One of the first plane 641" and the second plane 642" is a truncated conical plane and the other is an arc-shaped convex plane. According to another example as shown in FIG. 19, one of the first plane 641" and the second plane 642" is a truncated conical plane and the other is an arc-shaped concave plane. Certainly, in other examples, the first and second planes may also be two concave planes, two convex planes, two truncated conical planes or one truncated conical plane and one flat plane. Alternatively, the locking groove may also be defined by three planes.

The above contents are the preferred examples of the present disclosure. It should be noted that without departing from the technical principle of the present disclosure, the person skilled in the art may make some modifications and changes to the present disclosure, which may be considered as a part of the protection scope of the present disclosure.

We claim:

1. A clamping device for clamping a fastener, comprising:
a clamping jaw;
a first biasing member for biasing the clamping jaw;
a clamping body having a central axis, the clamping body being formed with a notch for receiving the clamping jaw; and
a driving assembly for driving the clamping jaw to clamp the fastener, the driving assembly being supported on the clamping body,
wherein the driving assembly further comprises:
a first member which can rotate and move axially relative to the clamping body; and
a second member which can be driven by the first member to move axially, without rotating, relative to the clamping body so as to push the clamping jaw to clamp the fastener,
wherein the clamping body comprises a receiving portion for receiving the fastener and a supporting shaft, and the receiving portion is provided with a guiding groove, wherein the notch is formed on the receiving portion and communicated with the guiding groove, and an inner wall of the second member is provided with a pushing block for pushing the clamping jaw and mating with the guiding groove so as to guide the second member to move axially with respect to the clamping body.

2. The clamping device for clamping a fastener according to claim 1, wherein the clamping jaw has an inner side wall and an outer side wall provided with an elongated groove, and an inclined guiding wall extends from the elongated groove, wherein the pushing block is formed with an inclined pushing plane mating with the guiding wall and having a width generally the same as that of the guiding wall and the elongated groove.

3. The clamping device for clamping a fastener according to claim 2, wherein the inner side wall of the clamping jaw is provided with a V-shaped groove for mating with a head of the fastener, and the inner side wall further is further provided with a circular groove below the V-shaped groove for receiving one end of the first biasing member.

4. The clamping device for clamping a fastener according to claim 3, wherein the supporting shaft comprises a first shaft portion having a hole for receiving the other end of the first biasing member, a second shaft portion on which the receiving portion of the clamping body is fixedly mounted and a third shaft portion provided with outer threads, and the inner wall of the first member is provided with inner threads for engaging with the outer threads.

5. The clamping device for clamping a fastener according to claim 4, wherein the clamping device further comprises an auxiliary biasing member mounted between the clamping body and the second member.

6. The clamping device for clamping a fastener according to claim 1, wherein the clamping device further comprises a quick-releasing mechanism having a clutch member which can be engaged with or disengaged from the driving assembly, when the quick-releasing mechanism is in an unreleased state, the clutch member is engaged with the driving assembly, and when the quick-releasing mechanism is in a released state, the clutch member is disengaged from the driving assembly.

7. The clamping device for clamping a fastener according to claim 6, wherein the clutch member is mounted to the clamping body and comprises an outer side wall provided with outer threads and an inner side wall provided with a groove to form two legs, and the quick-releasing mechanism further comprises a quick-releasing shaft which is inserted into the clamping body and moveable relative to the clamping body, wherein the front end of the quick-releasing shaft is provided with two concave portions having relatively small diameters and mating with the two legs of the clutch member, and a convex portion is arranged between the two concave portions.

8. The clamping device for clamping a fastener according to claim 7, wherein the quick-releasing mechanism further comprises a second biasing member for biasing the quick-releasing shaft.

9. The clamping device for clamping a fastener according to claim 8, wherein the rear end of the quick-releasing shaft has a quick-releasing button to be pressed by a user.

10. The clamping device for clamping a fastener according to claim 1, wherein the clamping body has a first retaining member, and the driving assembly has a second retaining member for mating with the first retaining member to retain the clamping device in a predetermined clamped state.

11. The clamping device for clamping a fastener according to claim 10, wherein one of the first retaining member and the second retaining member is a projection protruding towards the central axis of the clamping body, and the other one is a first groove extending in the longitudinal direction.

12. The clamping device for clamping a fastener according to claim 11, wherein the driving assembly further comprises a third member arranged between the first member and the second member, and a third retaining member and a fourth retaining member which are cooperated with each other for better retaining the clamping device in the predetermined clamped state.

13. The clamping device for clamping a fastener according to claim 12, wherein one of the third retaining member and the fourth retaining member is a pin mounted to the second member or the third member by an elastic member, and the other one is a second groove for receiving one end of the pin, wherein the second groove has a straight plane and an inclined plane opposite to each other.

14. A clamping device for clamping a fastener, comprising:
a clamping jaw;
a first biasing member for biasing the clamping jaw;
a clamping body having a central axis, the clamping body being formed with a notch for receiving the clamping jaw; and
a driving assembly for driving the clamping jaw to clamp the fastener, the driving assembly being supported on the clamping body,
wherein the driving assembly further comprises:
a first member which can rotate and move axially relative to the clamping body; and
a second member which can be driven by the first member to move axially, without rotating, relative to the clamping body so as to push the clamping jaw to clamp the fastener,
wherein the clamping body is provided with a guiding groove communicated with the notch, the second member is provided with a pushing block for pushing the clamping jaw and mating with the guiding groove so as to guide the second member to move axially with respect to the clamping body.

* * * * *